(12) United States Patent
Jensen (10) Patent No.: US 9,032,132 B2
(45) Date of Patent: May 12, 2015

(54) APPARATUS AND METHOD OF UNIVERSAL SERIAL BUS, USB, COMMUNICATION

(75) Inventor: Rene Elbaek Jensen, Bagsvaerd (DK)

(73) Assignee: GN Netcom A/S (DK)

( * ) Notice: Subject to any disclaimer, the term of this patent is extended or adjusted under 35 U.S.C. 154(b) by 243 days.

(21) Appl. No.: 13/536,244

(22) Filed: Jun. 28, 2012

(65) Prior Publication Data

US 2013/0013841 A1    Jan. 10, 2013

(30) Foreign Application Priority Data

Jul. 6, 2011    (EP) ...................................... 11172854

(51) Int. Cl.
G06F 13/20    (2006.01)
G06F 13/38    (2006.01)
G06F 13/40    (2006.01)

(52) U.S. Cl.
CPC ............ G06F 13/387 (2013.01); G06F 13/385 (2013.01); G06F 13/4027 (2013.01)

(58) Field of Classification Search
CPC .. G06F 13/4027; G06F 13/385; G06F 13/387
USPC ....................................................... 710/313
See application file for complete search history.

(56) References Cited

U.S. PATENT DOCUMENTS

| | | | |
|---|---|---|---|
| 6,389,495 B1 * | 5/2002 | Larky et al. ........................ | 710/8 |
| 6,976,105 B1 | 12/2005 | Wright | |
| 7,293,118 B1 | 11/2007 | Wright | |
| 8,296,487 B1 * | 10/2012 | Yoon et al. ........................ | 710/74 |
| 8,332,557 B2 * | 12/2012 | Sthoeger et al. .............. | 710/110 |
| 2003/0041205 A1 * | 2/2003 | Wu et al. ........................ | 710/302 |
| 2004/0019732 A1 | 1/2004 | Overtoom et al. | |
| 2010/0083020 A1 * | 4/2010 | Suzuki .......................... | 713/322 |
| 2012/0265911 A1 * | 10/2012 | Connolly ...................... | 710/300 |
| 2012/0303331 A1 * | 11/2012 | Niemczak et al. ............ | 702/198 |

FOREIGN PATENT DOCUMENTS

TW    518502    1/2003

OTHER PUBLICATIONS

Office Action for Chinese Application No. 2012102320433 dated Nov. 3, 2014.

* cited by examiner

Primary Examiner — Nimesh G Patel
(74) Attorney, Agent, or Firm — Altera Law Group, LLC (57) ABSTRACT

The USB device (e.g. an audio class device) comprises a USB bus interface that connects to an upstream USB port and a USB logical device that provides first USB endpoints for upstream communication on a first channel. The USB host comprises a USB host controller that connects to a downstream USB port, and a USB driver that provides second USB endpoints for downstream communication on a second channel; wherein the USB host operates concurrently with the USB device. The processor is configured to communicate data between the first channel and the second channel via the first USB endpoints and the second USB endpoints, respectively.

16 Claims, 7 Drawing Sheets

APPARATUS AND METHOD OF UNIVERSAL SERIAL BUS, USB, COMMUNICATION

Generally, at the first end of a Universal Serial Bus, USB, connection—at a host—communication originates from or is destined for a client application such as a so-called softphone, an audio player and/or recorder that runs as software on a general purpose computer or such as a client application that runs on a dedicated device such as a camera to control a printer. At the other end of the USB connection—at the device—communication originates from or is destined for a particular function such as e.g. an audio function that provides input of audio data from a microphone and/or output of audio data to a loudspeaker. Typically general purpose computers have USB functionality for communicating with USB devices and the computer operates as a USB host where devices connect as USB devices.

A USB device must be configured by a USB host when connected thereto. The device is configured to belong to a specified class of devices. It follows from the USB specification that, conventionally, a client application can enumerate only one device of the same class at the same time. Thus, the client application cannot communicate concurrently with two devices of the same class.

One class of USB devices is an audio class comprising physical devices such as microphones, loudspeakers, soundcards, headsets and music instruments. Devices of this class are configured to communicate audio data and optionally also state values from a user interface with the device. Thereby, a device of the audio class can comprise a simple user interface for muting sound, turning volume up and down etc. Another class of USB devices is a human interface device class comprising physical devices such as keyboards, pointing devices such as computer mice etc.

Generally, the Universal Serial Bus, USB, specification is available at www.usb.org.

SUMMARY

There is provided an apparatus for communication according to the Universal Serial Bus, USB, specification, comprising: a USB device that comprises a USB bus interface that connects to an upstream USB port and a USB logical device that provides first USB endpoints for upstream communication on a first channel; a USB host that comprises a USB host controller, that connects to a downstream USB port, and a USB driver that provides second USB endpoints for downstream communication on a second channel; wherein the USB host operates concurrently with the USB device; and a processor configured to communicate data between the first channel and the second channel via the first USB endpoints and the second USB endpoints, respectively.

Thereby the apparatus interconnects two separate USB systems via a processor. The apparatus operates as a device in one USB system and as a host in another USB system. The two separate USB systems are interconnected by means of a processor that is programmed to communicate data between the two USB systems. The processor carries out any type of data transfer or signal processing between the two systems.

Since both USB devices and USB hosts are perfectly in accordance with the USB specification, respectively, such an apparatus can comply with the USB specification while enabling new options since the processor can be programmed to execute signal processing in a transfer path between the two systems.

In some embodiments the apparatus comprises a housing that accommodates one or more microcontrollers with memory, where the first endpoints and the second endpoints are provided at predetermined addresses in the memory. The microprocessor can be programmed to execute the operations of the processor and/or the USB device and/or the USB host.

The endpoints may comprise endpoints of the type designated 'IN' and/or 'OUT' and/or 'CONTROL' and/or 'INTERRUPT'. The endpoints may additionally comprise other types of endpoints. The endpoints serve as an interface for USB communication. The communication that takes place between the respective endpoints of a device and a host is conventionally referred to as taking place via 'pipes' where the endpoints terminates the pipe at each end.

In some embodiments the USB device is configured as an audio class product to input or output audio data e.g. in a Pulse Code Modulation, PCM, format, which is used to digitally represent samples of audio signals. The processor is configured to process such audio data. In some embodiments the processor is configured to process data according to specifications or general rules known to apply for telephony systems or telephony devices such as e.g. headsets where data are transferred as real-time data with short delays to avoid degradation of speech communication.

The processor may comprise a buffer for buffering a stream of data packets received from one of the USB systems before they are transmitted on to the other USB system. However, such a buffer is limited in size to avoid disturbing latency or delay and stores only a few packets in its buffer memory at the same time e.g. less than 2, 4, 8, 16 or 256 packets or less than 500 or 1000 milliseconds of data transfer. In some embodiments the processor transfers data and performs signal processing on data transferred between the two USB systems in a cut-through way, where transmission of a packet is initiated before the packet is received in full.

Such processing and transmission of data packets is possible since the USB device and the USB host operates concurrently. However, in some embodiments the USB host and the USB device operates synchronously or asynchronously of each other.

It follows from the USB specification that, conventionally, a client application can enumerate only one device of the same class at the same time. Thus, the client application cannot communicate concurrently with two devices of the same class.

In some embodiments the processor is configured to communicate data between the first channel and/or a third channel and/or the second channel.

Thereby, and in accordance with the USB specification, a client application can enumerate exactly one device of the same class at the same time. However, in some embodiments, the processor can be programmed to communicate downstream concurrently with two or more devices of the same class under the USB specification on the respective second and third channel via the USB host while the apparatus is configured upstream as a single USB device.

Alternatively, the third and/or any further channels are not USB compliant. Such a channel may be in accordance with different specification and provide analogue and/or digital data input and/or output. In some embodiments a digital channel is in accordance with the Sony/Philips Digital Interface, S/PDIF, specification. In some embodiments an analogue channel is provided.

In some embodiments the processor comprises data converters or so-called codecs to interface with USB systems via the USB host or the USB device e.g. to convert between PCM data and S/PDIF data or between PCM data and analogue signals.

Communication via the third channel takes place concurrently with communication on the first and/or second channel.

Whether or not communication on the third channel takes place according to the USB specification, the apparatus appears upstream as a single device for a respective device class.

In some embodiments the processor is configured to communicate data between the first channel and further channels such as a third, fourth, fifth and sixth channel. Alternatively, the processor is configured to communicate data between the first channel and still further channels.

In some embodiments the processor is configured with: a splitter to split a signal from the first channel to the second channel and the third channel; and/or a mixer to mix audio signals input at the second and third channel and to output a mixed signal on the first channel.

The splitter makes it possible to split a stream of data e.g. a stream of audio data, an audio stream, to the second channel and the third channel via the USB host in such a way that respective receivers connected to the channels receives data originating from the first channel. In case of audio data, an audio stream transmitted to the USB device e.g. from a softphone application running on a general purpose computer can be split to two or more physically separate devices e.g. to two headsets.

In some embodiments the data output by the splitter are in the same format. In some embodiments the second and third channel are parallel USB channels, whereby two USB devices connected to the apparatus can receive the data concurrently. In other embodiments, the third channel is in accordance with a different specification than the USB specification and the processor comprises a converter to convert data received from the first channel into that format.

The mixer makes it possible to mix a first stream of data received via the second and a second stream of data received via the third channel to single stream of data that is transmitted upstream on the first channel. In some embodiments the mixer mixes signals input to the mixer at equal weights, but the signals can alternatively be mixed with different weights to emphasize, in the signal output from the mixer, one signal input to the mixer over another one.

In some embodiments the mixer and splitter operates in parallel to split data received by the USB device in a downstream direction to multiple devices and to mix data received from (the) multiple devices before mixed data are transmitted in an upstream direction. This is convenient especially for audio data, where microphone signals, signals from music instruments or players can be transmitted as a single mixed signal to a client application at a computer while an audio signal from the client application can be shared among, split to, multiple speakers, recorders or other devices consuming audio data.

In some embodiments the audio signal is a mono signal, a stereo signal, a 5.1, 6.1 or 7.1 surround sound signal or any other type of audio signal. In some embodiments the audio signal is a pulse code modulation, PCM, signal.

In some embodiments the processor comprises a sample rate converter that is capable of up-sampling and/or down-sampling an audio signal to make the data transmitted upstream conform to a unified sample rate although e.g. the data arriving on the third channel have a different sample rate than the data arriving on the second channel. Thereby the mixer can perform mixing at the unified sample rate. Alternatively/additionally re-sampling can be performed by the processor in the downstream direction; in some embodiments re-sampling is performed after splitting.

In some embodiments the apparatus comprises an audio interface for communicating analogue and/or digital audio data. In some embodiments the audio interface comprises a codec.

Thereby an audio interface is provided for the third channel to the processor. In some embodiments the codec comprises a converter converting from one digital formal to another and in other embodiments the codec comprises an analogue-to-digital converter and/or a digital-to-analogue converter. The codec may also comprise a power amplifier or driver for driving a loudspeaker and/or a preamplifier for amplifying a signal from a microphone. In some embodiments the audio interface has a port or connector such as e.g. a Jack-connector for an analogue and/or digital signal and/or a Toslink connector for an optical digital signal.

In some embodiments the USB device configures as an USB audio class device.

During configuration of the USB device, which take place on physical interconnection with the upstream USB host or on a reset issued by the USB device, the USB device supplies property values to the USB host. In some embodiments the USB device configures as an audio class device and supplies audio property values. The audio property values are stored for reading only and represent properties of the audio interface which may include properties of the processor. The audio properties may comprise sample rate, bit resolution, availability of a mono channel or stereo channels etc. The audio properties may also represent a range of values e.g. a range of sample rates and/or a range of available bit resolutions e.g. 8, 16 and 24 bits. In some embodiments configuration values received from the upstream USB host are used to control audio properties of the processor.

In some embodiments the apparatus comprises a USB hub that provides at least two USB ports for respectively conveying the second channel and third channel.

Thereby the second and third channel can be provided as parallel USB channels by a USB hub. The USB hub expands a single USB port to a host controller into multiple ports so that there are more ports available to connect devices to the USB host. In some embodiments the USB host and/or the USB hub implements only a selected subset of device classes among the ones specified by the USB specification. The subset of classes may be the audio class and in some embodiments also the Human Interface Device, HID, class.

In some embodiments the USB host configures a downstream USB device during a configuration process; and the USB device configures firstly as a device of a first class, and secondly, when at least a portion of the configuration process has progressed, re-configures as a device of a second class.

In some embodiments the first class is the Human Interface Device, HID, class and the second class is the audio device class. Thereby, for instance if no audio function and no audio property values are known when the apparatus is connected to an upstream host it can configure e.g. as a HID device class and it does truly not appear to the client software as having any audio function. Meanwhile the apparatus is configured as a HID device and communication between the apparatus and an upstream general purpose computer is possible e.g. for installing so-called firmware updates.

As a downstream device is connected a configuration process for configuring that downstream device is run by the USB host of the apparatus. During that process audio property values for the downstream device is retrieved. The USB device of the apparatus then requests re-configuration towards the upstream host and as that process progresses the USB device of the apparatus can supply the audio properties retrieved from the downstream device to the upstream USB host. Towards the end of the configuration processes, the configuration values from the upstream host are delivered via the processor to the downstream USB device and configuration can be completed.

Consequently, the USB device of the apparatus can be configured with audio property values reflecting the audio capabilities of a downstream USB device without violating the USB specifications.

In some embodiments the processor is configured to communicate configuration values and/or state values, via the USB host controller, to a USB device; and where the configuration values and/or state values are determined by the processor.

Thereby a desired logic can be implemented for controlling configuration values and state values of e.g. HID states for the audio class devices. In some embodiments such HID states represents well-known audio controls such as 'microphone mute', 'disconnect loudspeaker', 'volume up' and 'volume down' etc. By means of the processor it is possible to determine how to respond to such states or changes thereto. In some embodiments 'mute' are applied to all downstream USB devices even though 'mute' is activated on one device only. In other embodiments 'mute' is activated for a respective device only.

In some embodiments the apparatus comprises master controls that affect signals communicated on the first channel and/or the second and third channel.

Physically the master controls may be the form of control knobs and/or buttons etc. as known in the art. The master controls takes effect by means of the processor.

In some embodiments the there is provided a headset system comprising a headset with a loudspeaker and a microphone and an apparatus according to any of the above embodiments.

In some embodiments the headset and the apparatus are connected by a wired, but detachable connection e.g. communicating analogue signals. In other embodiments the headset comprises a USB device and connects to the apparatus by means of a USB cable.

In some situations such a headset system is convenient, e.g. in a call-centre staffed with operators to take incoming telephone calls and with supervisors to educate and supervise the operators. Supervision often has to take place during active calls. However, with a conventional headset for USB connectivity, plugging in a second, supervisor's USB headset will result in all audio being diverted to the supervisor's headset only and not to the operator who originally had the call. With a USB headset system as mentioned above, the supervisor is able to plug in his/hers USB headset to the apparatus without diverting audio away from the operator. In addition, they may both have their individual preferences for headset speaker volume and microphone sensitivity.

DETAILED DESCRIPTION

Figure 1:
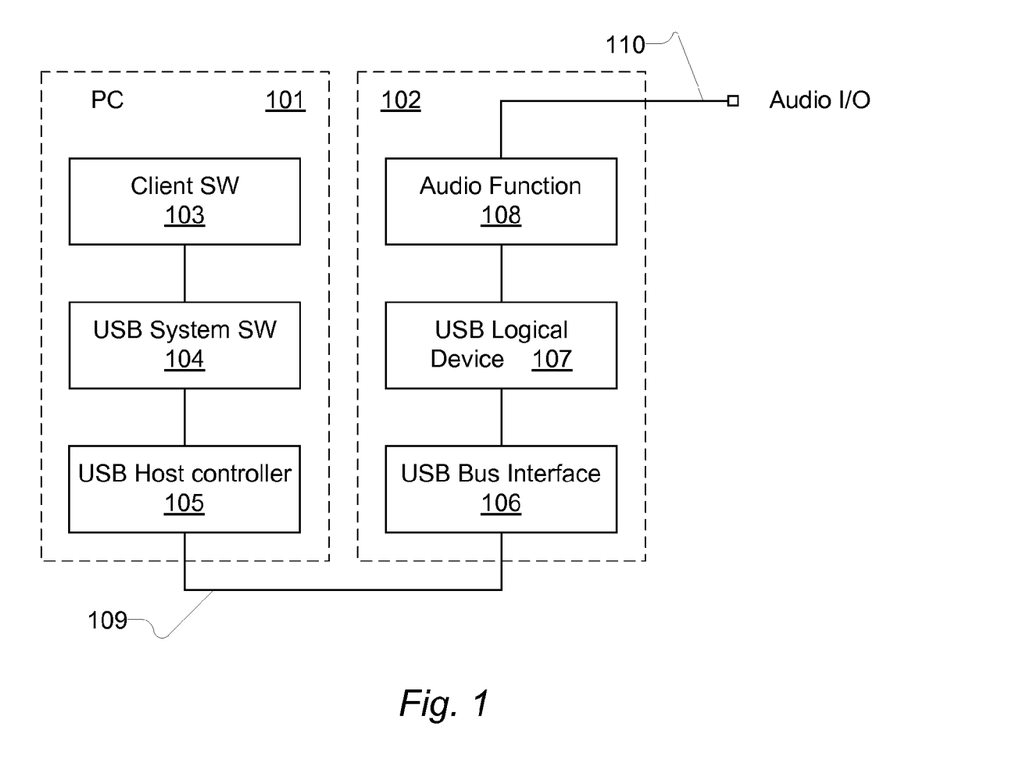
FIG. 1 shows computer, with a USB host that communicates with a downstream USB device.

FIG. 1 shows computer, with a USB host that communicates with a downstream USB device. Such a system is a conventional USB system. The computer 101 which oftentimes is a general purpose computer comprises the hardware and software to serve as a USB host. The computer 101 is interconnected with a USB device 102 at respective USB ports (not shown) via a USB cable 109. The device 102 may be configured as an audio class device and may comprise a port 110 for providing input and/or output of electrical audio signals or the device 102 may e.g. comprise electro-acoustical transducers such as a microphone and a loudspeaker (not shown). In some embodiments the device 102 is a headset with USB connectivity to the computer.

The computer 101 comprises a USB host with a host controller 105, USB system software 104 and client software 103. The device 102 comprises a structure matching the USB host and comprises a USB bus interface 106, a USB logical device 107 and an audio function 108. This way of depicting a USB system is also used in the USB specification available at www.usb.org.

Generally, it should be noted that USB is a hierarchical system where a USB host sits at the top of the hierarchy and controls communication within the USB system and is responsible for configuring USB devices within the system. A USB device has some defined function e.g. an audio function 108 and communicates via the USB system with some client software running on the computer 101 and using the function at the device. Also, a USB device can be configured with multiple functions and is sometimes referred to as a compound device. Since a USB device attach to the USB system via a respective and physical USB port, the USB specification allows USB hubs that can expand a USB port into multiple USB ports and thereby expand the hierarchy with more devices, where the USB host remains as the single USB host of the system. USB host mainly serves to relay data from an upstream port to multiple downstream ports and vice versa. Each device attached to the USB hub is configured and made individually addressable for the USB host.

Generally, the term 'upstream' is used to designate a direction upwards in the hierarchy towards the host, whereas 'downstream' is used to designate a direction downwards in the hierarchy towards devices.

Generally, the term 'channel' is used to designate any route, or a portion thereof, a) in a USB system between a USB host and a USB device or b) in another system. When the channel runs within a USB system it is also denoted a 'pipe'. A pipe is terminated at its respective ends in 'endpoints'. This is further explained in the USB specification.

Figure 2:
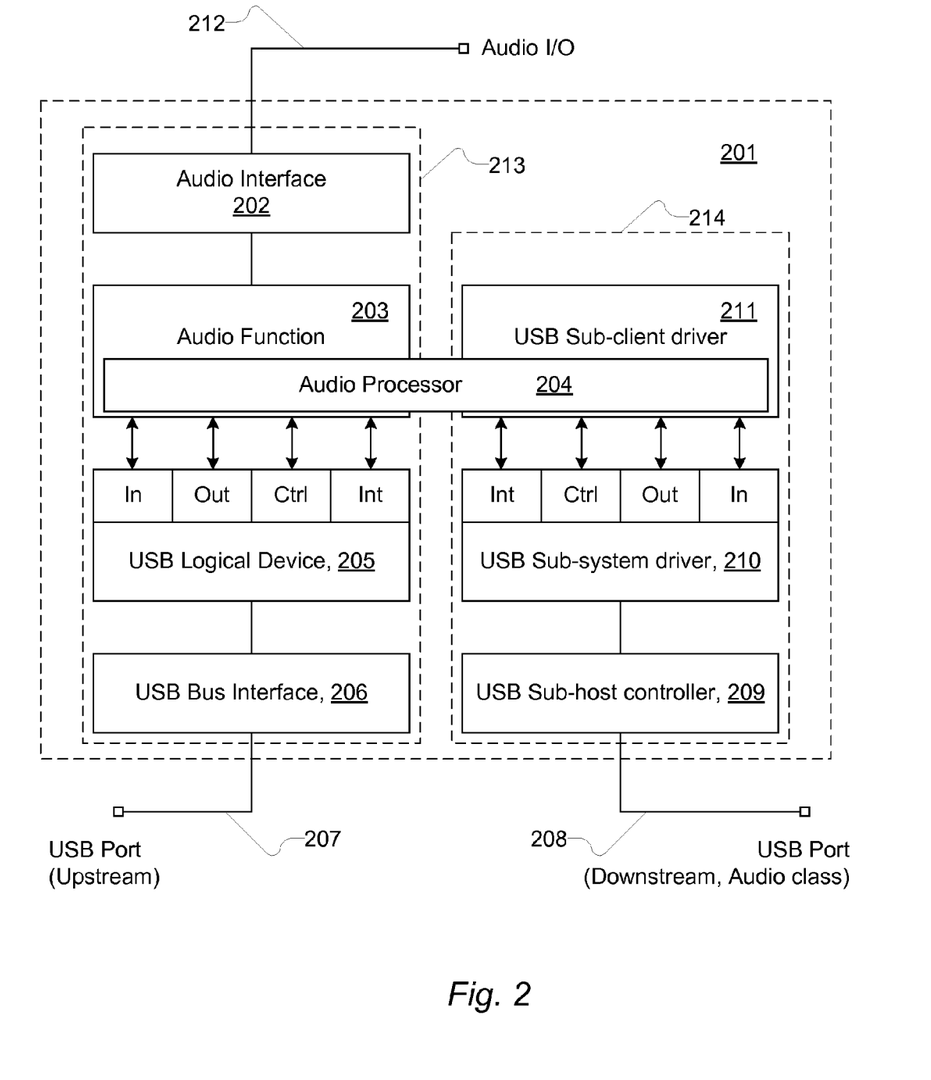
FIG. 2 shows a USB device, with an audio interface, and a USB host for communicating with a USB sub-device with a further audio interface.

FIG. 2 shows an apparatus with a USB device, with an audio interface, and a USB host for communicating with a USB sub-device with a further audio interface. The apparatus 201 comprises a USB device 213 that connects to an upstream USB host as described in connection with FIG. 1. A first USB system is thereby established. Additionally, the apparatus 201 comprises its own USB host 211 that controls a second USB system. In the below USB devices attached to the second USB system is sometimes referred to as sub-devices or USB sub-devices. A processor 204, which is some embodiments is an audio processor, interconnects the first USB system and the second USB system to communicate data between the two systems.

The USB device 213 of the apparatus comprises a USB bus interface 206 that connects to an upstream USB port 207 and a USB logical device 205 that provides first USB endpoints for upstream communication on a first channel, which is a pipe. Further, in some embodiments, the USB device comprises an audio function 203 and an audio interface 202. The audio interface 202 is a hardware interface for interfacing with audio transducers. The audio function 203 is software and/or hardware communicating audio data from/to the audio interface with a client application running on a computer.

The USB host 214 comprises a USB host controller 209 that connects to a downstream USB port 208, and a USB driver 210 that provides second USB endpoints for downstream communication on a second channel, which is a pipe. In some embodiments the USB host comprises a USB sub-client which in co-operation with the audio processor 204 determines which data to communicate with functions in sub-devices.

The USB host operates concurrently with the USB device such that an on-going stream of data that is destined for the USB device 213 from an upstream USB host can be forwarded or re-transmitted via the processor and the USB host 214 to sub-devices (not shown) connected thereto without significantly delaying or interrupting the flow of data.

Conventionally, a USB logical device 205 of a USB device and USB system software 210 of a USB host communicates data via endpoints. Endpoints terminate the so-called pipes at respective ends of a pipe. There are defined various types of endpoints of which the endpoints in some embodiments comprise endpoints of the type designated 'IN' and/or 'OUT' and/or 'CONTROL' abbreviated 'Ctrl' and/or 'INTERRUPT' abbreviated 'Int'. The endpoints designated 'IN' and 'OUT' is configured for respectively inputting and outputting data to be transported over a USB pipe. In this embodiment audio data are communicated in a pulse coded modulation, PCM, format. The endpoints 'CONTROL' and 'INTERRUPT' are inter alia for respectively communicating configuration values during a configuration process and for interrupting the USB host to fetch more recent data e.g. to read state values changed during a man-machine-interaction via a user interface (not shown). Physically, the endpoints are provided as an address space in a memory of the processor. The processor 204 has access to the endpoints and reads and modifies values thereof to control how to interface the first USB system with the second USB system. Thereby a desired logic can be implemented for controlling configuration values and state values of e.g. HID states for the audio class devices. In some embodiments such HID states represents well-known audio controls such as 'microphone mute', 'disconnect loudspeaker', 'volume up' and 'volume down' etc. By means of the processor it is possible to determine how to respond to such states or changes thereto. In some embodiments 'mute' are applied to all downstream USB devices even though 'mute' is activated on one device only. In other embodiments 'mute' is activated for a respective device only.

In the depicted embodiment the first channel (a pipe) is provided between the USB device 213 and the upstream USB host (not shown), the second channel (a pipe) is provided between the USB host 214 and downstream USB sub-devices (not shown) and a third channel is provided via the audio interface 202. The third channel is not USB compliant. Such a channel may be in accordance with different specification and provide analogue and/or digital data input and/or output. In some embodiments a digital channel is in accordance with the Sony/Philips Digital Interface, S/PDIF, specification. In some embodiments an analogue channel is provided. The processor communicates via the first, second and third channels concurrently such that two-way real-time communication is not significantly delayed or interrupted.

Figure 3:
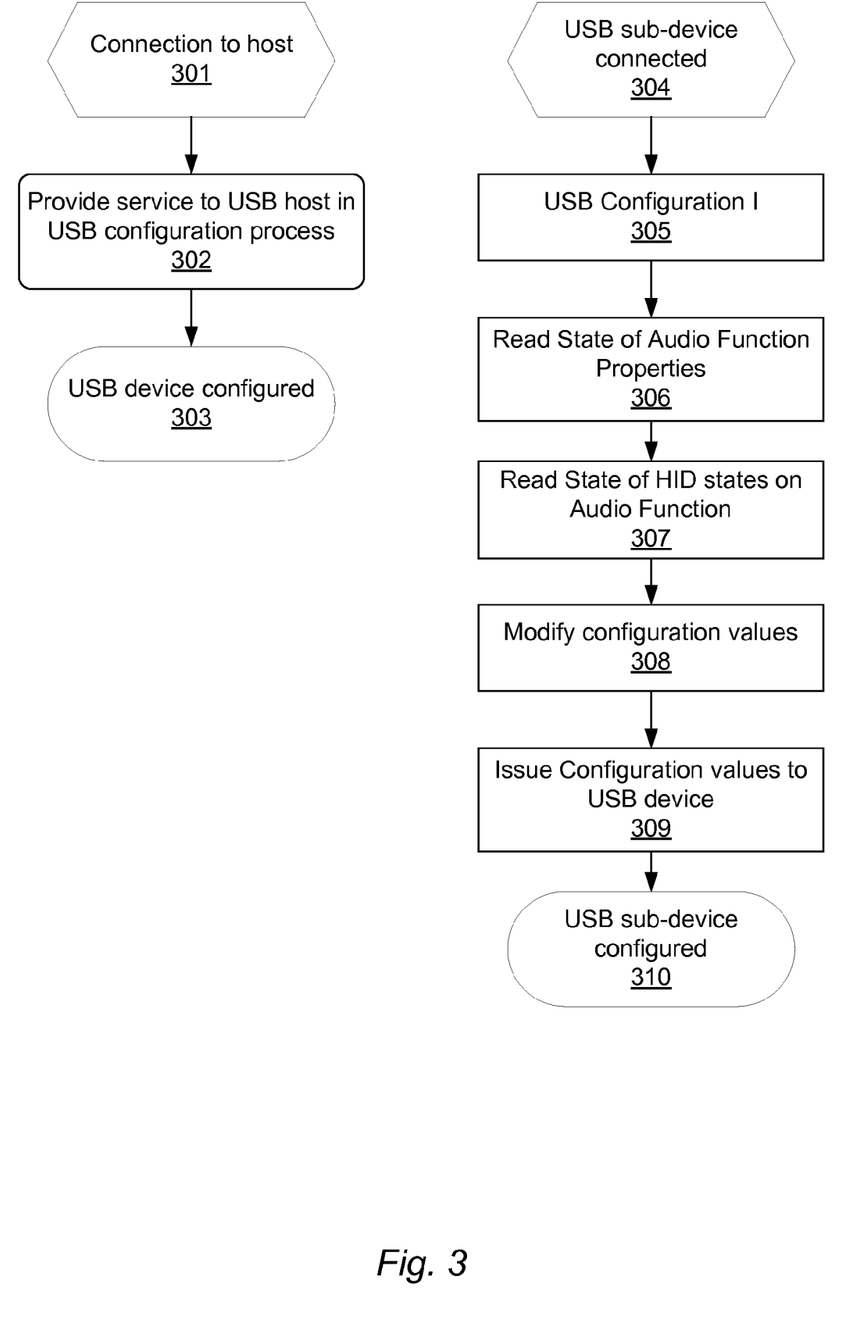
FIG. 3 shows a flowchart of performing configuration of a USB device, with an audio function, and configuration of a sub-device with a further audio function.

FIG. 3 shows a flowchart of performing configuration of a USB device, with an audio function, and configuration of a sub-device with a further audio function. Thus two configuration processes, a first and a second, progress independently of each other.

The first configuration process is initiated when the USB device, 213, of the apparatus 201 is attached physically to an upstream USB host as indicated by the event 301. In step 302 the USB device of the apparatus provides service to the upstream USB host during the USB configuration process as it is conventionally known to a person skilled in the art. Following step 302 the USB device 213 is configured and provided with configuration values from the upstream USB host.

The second configuration process is initiated when a USB sub-device is attached physically to the USB host 214 of the apparatus 201 as illustrated by event 304. Then in step 305 a first portion of the second configuration process is performed and in the following steps 306 and step 307 state values of audio function properties and state values of HID states on the audio function are read from the attached USB sub-device, respectively. The USB host 214 consequently holds these values and by means of the processor 204 it determines which configuration values to send back to the USB device. The processor then determines how to configure the USB sub-device based on the read values and any other values stored by the processor e.g. other values retrived during a preceding first configuration process or other values stored in a read-only way in the processor. Following the second configuration process the USB sub-device is configured in step 310 for operation as a USB device.

In some embodiments the second configuration process is initiated before the first configuration is initiated or completed. In some embodiments first configuration values are sent to the USB device during the second configuration process if the first configuration process is completed, whereas second configuration values are sent to the USB device if the first configuration process has not yet been initiated or completed. The first and second configuration values may be different.

In some embodiments the above configuration processes are performed for an apparatus as shown in FIG. 2, where an audio interface is embedded with the apparatus.

Figure 4:
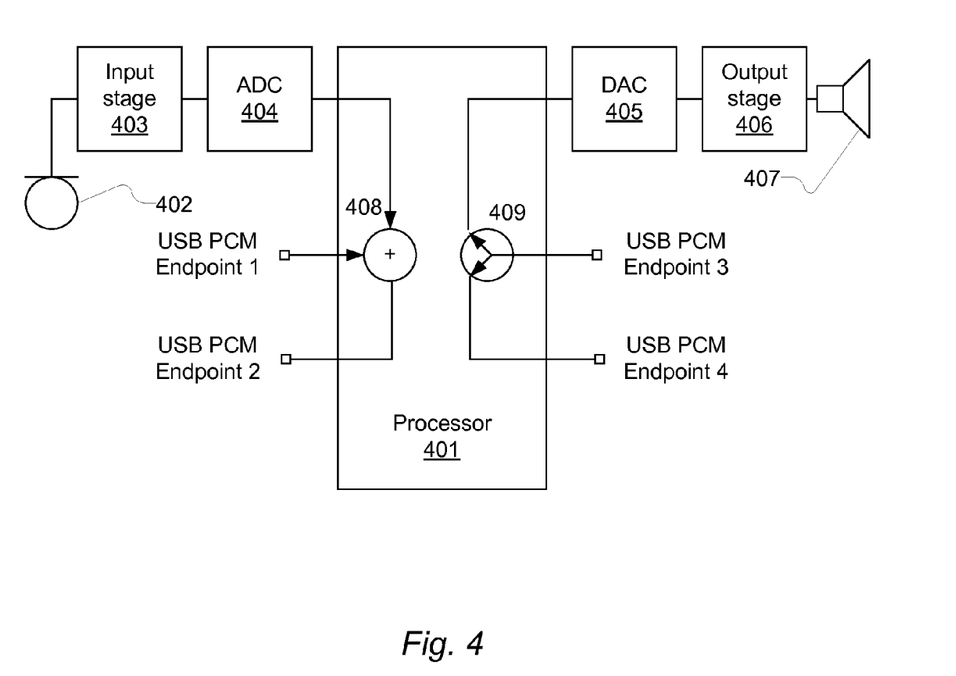
FIG. 4 shows an audio interface and a processor.

FIG. 4 shows an audio interface and a processor. The audio interface comprises hardware to interface audio signals to the apparatus in a non-USB compliant way to thereby provide a third or more channels to the processor. The audio interface comprises a first signal path with a microphone 402, an input stage 403 e.g. comprising a pre-amplifier and an analogue-to-digital converter 404. In some embodiments the first signal path comprises a converter to convert between two or more data formats and/or a re-sampler for performing up-sampling and/or a down-sampling. The audio interface also comprises a second signal path with a digital-to-analogue converter 405, an output stage 406 e.g. comprising a driver or power amplifier and a loudspeaker 407. In some embodiments the audio interface constitutes a portion of a headset.

The processor 401 comprises a mixer 408 and a splitter 409. The mixer receives audio signals along two channels; the second channel via a USB endpoint and the third channel via the first signal path, and outputs a mixed signal on the first channel via a USB endpoint. The splitter receives a signal from the first channel via a USB endpoint and splits the signal to the second channel via a USB endpoint and to the third channel via the second signal path. With the splitter and mixer bi-directional signal transfer is provided. However, in some embodiments the splitter is provided without the mixer and vice versa.

The processor is shown in connection with the audio interface. However, in case of the embodiment shown in FIG. 5 below where all channels are provided as USB pipes the audio interface is not needed and the processor can communicate on the channels via respective endpoints or sets of endpoints.

Figure 5:
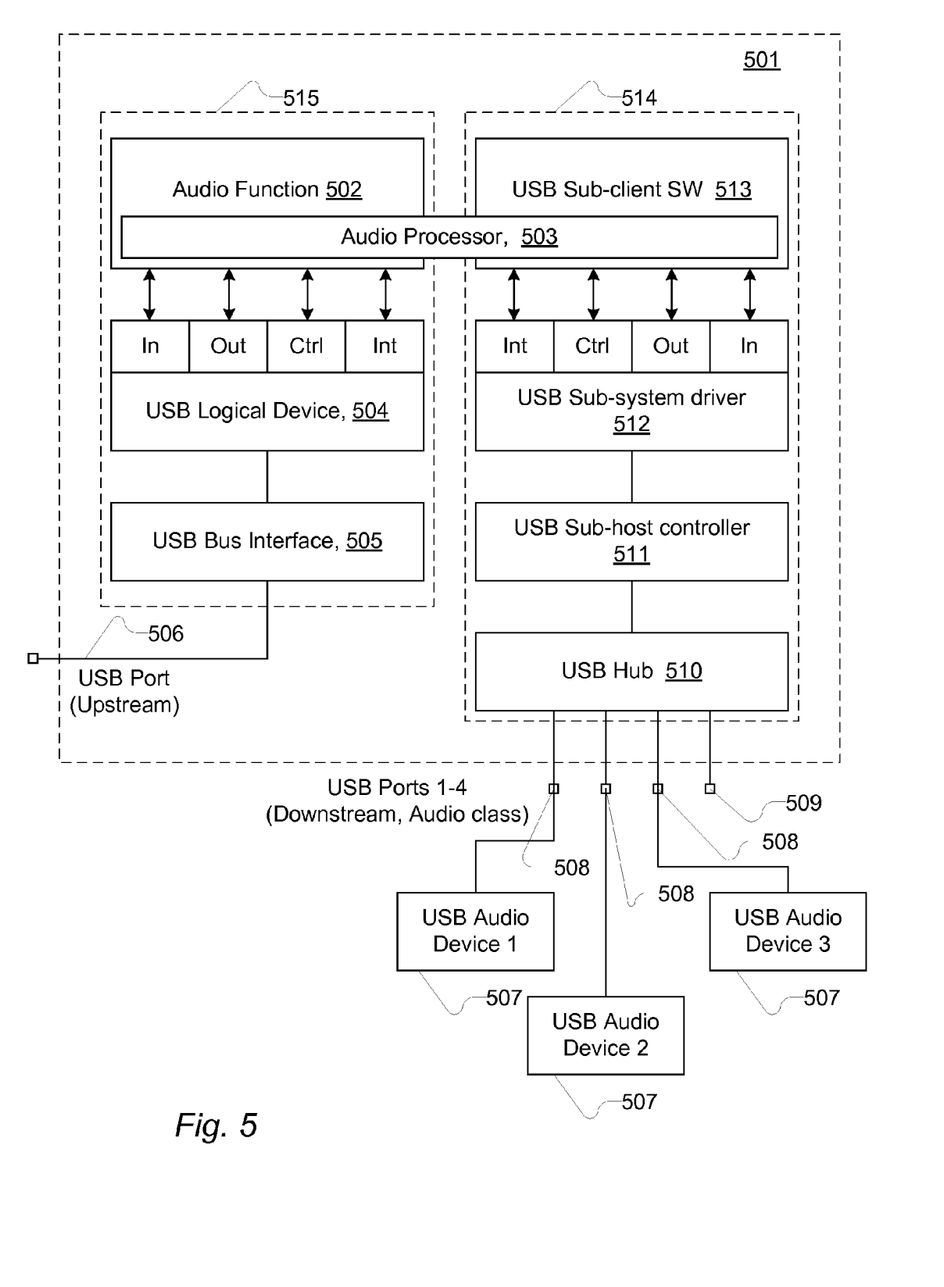
FIG. 5 shows a USB device and a USB host for communicating, in parallel, with multiple USB sub-devices with a respective audio interface.

FIG. 5 shows an apparatus with a USB device and a USB host for communicating, in parallel, with multiple USB sub-devices with a respective audio interface.

The apparatus 501 comprises a USB device 515 that connects to an upstream USB host as described in connection with FIG. 1. A first USB system is thereby established. Additionally, the apparatus 501 comprises its own USB host 514 that controls a second USB system. A processor 503, which is some embodiments is an audio processor, interconnects the first USB system and the second USB system to communicate data between the two systems.

The USB device 515 of the apparatus comprises a USB bus interface 505 that connects to an upstream USB port 506 and a USB logical device 504 that provides first USB endpoints for upstream communication on a first channel, which is a pipe. Further, in some embodiments, the USB device comprises an audio function 502. The audio function 502 is software and/or hardware cooperating with the processor 503 for communicating audio data from/to the USB host 514 with a client application running on a computer.

The USB host 514 comprises a USB host controller 511 that connects to downstream USB ports 508; 509 via a USB hub 510. The USB host controller 511 further comprises a USB sub-system driver 512 that provides second USB endpoints for downstream communication on a second channel, which is a pipe. Additionally, due to the USB hub 510, the USB sub-system driver 512 provides third USB endpoints for additional downstream communication on a third channel, which is also a pipe. As shown, the USB hub 510 has four ports for attaching a respective device and for communicating via one or more pipes in parallel.

In some embodiments the USB host comprises a USB sub-client 513 which in co-operation with the audio processor 503 determines which data to communicate with functions in sub-devices 507 attached to the USB host via the hub 510.

In the depicted embodiment the first, second and third channel is provided all as USB pipes.

In some embodiments a non-USB compliant channel is provided via an audio interface as described in connection with FIG. 2 in addition to multiple channels provided via the USB hub 510. The processor 503 is modified accordingly to process signals to/from the respective channels in a concurrent way.

In some embodiments the processor 503 controls configurations of USB sub-devices differently, where a first USB sub-device is given a status of a primary or master device and where second and further USB sub-devices are given a status of sub-ordinate or slave. Thereby when the first USB sub-device is a headset communicating during a phone call via a soft-phone on the computer, the phone call can continue even if a second or further sub-device is connected or disconnected during the call. The logic determining how to configure and communicate with USB sub-devices is determined by the processor 503. The first USB sub-device is in some embodiments determined to be the USB sub-device firstly connected to the apparatus.

Figure 6:
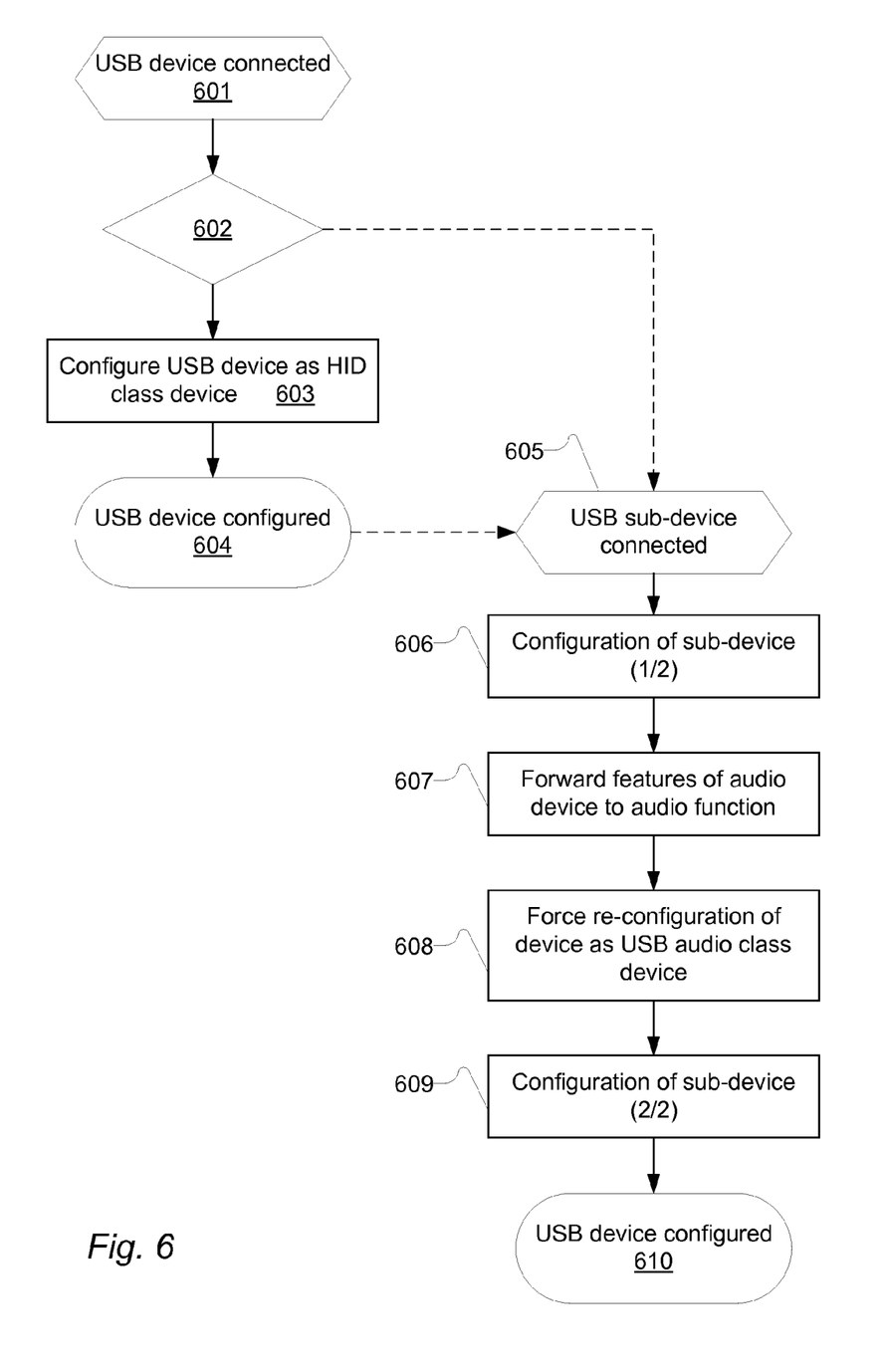
FIG. 6 shows a flowchart of performing configuration of a USB device.

FIG. 6 shows a flowchart of performing configuration of a USB device. In a first situation configuration is initiated by detection of the event 601 that the USB device 515 of the apparatus 501 is connected to an upstream USB host. In a second situation configuration is initiated by detection of the event 605 that a USB sub-device is connected to the USB host 514 of the apparatus 501. Thus two different configuration processes can be performed.

In the first situation, initiated by event 601, the USB device of the apparatus is temporarily configured as a device of a first class e.g. a HID device class. In the second situation, initiated by event 605, the USB device of the apparatus is configured or re-configured as a device of a second class e.g. an audio device class. Thereby it is possible to comply with the USB specification e.g. in respect of time intervals allowed for configuration and provide values from a USB sub-device to an upstream host via the USB device 515 of the apparatus during re-configuration despite the USB sub-device is not yet connected to the host 514 during configuration of the USB device 515.

Following event 601 the processor 503 determines whether or not a USB sub-device is already connected to the USB host 514. In case a sub-device is not yet connected configuration proceeds to step 603 where the USB device is configured as a HID class device. Subsequently, the USB device of the apparatus is configured. In this state, where the USB device is configured as HID device, the processor and a client application running on the upstream computer can communicate e.g. to send a so-called firmware update to the apparatus.

In case a sub-device was already connected or a USB sub-device connects to the USB host 514 event 605 is raised. Then in step 606 a first portion (½) of configuring the USB sub-device is performed. Following the first portion of configuration audio property values and state values from the USB sub-device is retrieved by the USB host 514 and the values are then forwarded or made available to the audio function 502 and/or processor 503. In step 608 the USB device 515 then forces configuration, or re-configuration as the case may be, of the upstream USB host to configure or re-configure itself as an audio class device using the values retrieved from the USB sub-device. Then, in step 609 configuration of the USB sub-device can be completed using configuration values sent to the USB device 515 during its configuration. Following these steps the USB device is finally re-configured and the configuration of the USB sub-device is completed.

In this way the apparatus gets its information for its own configuration from the sub-devices whenever they are connected and at least partially configured. Consequently, the properties of the sub-devices are exposed to the upstream computer system.

Figure 7:
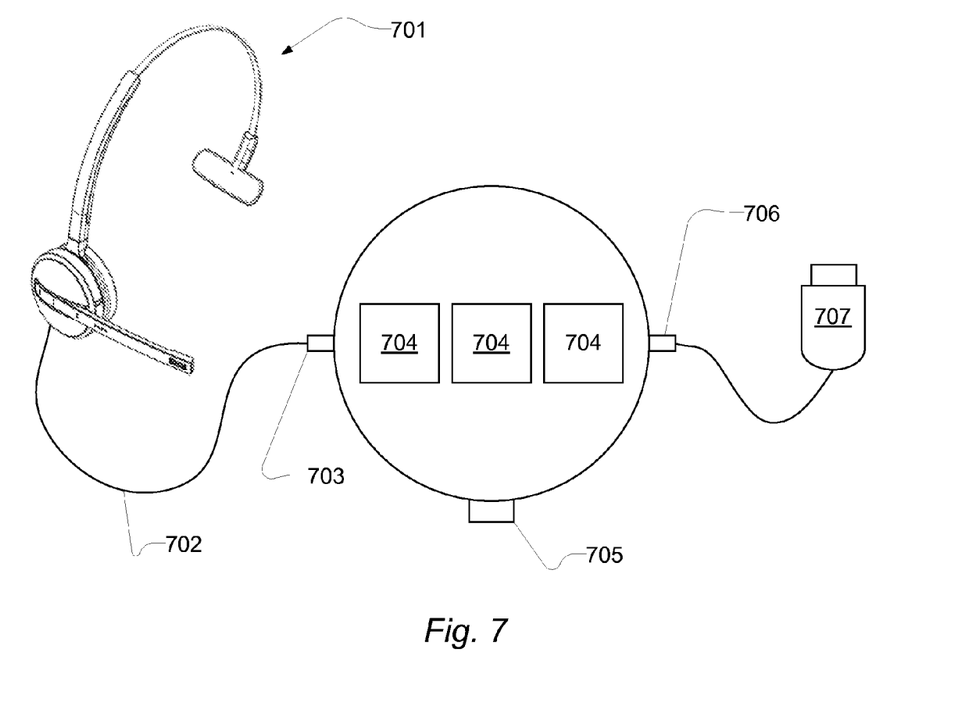
FIG. 7 shows an apparatus with an audio interface and a downstream USB port.

FIG. 7 shows an apparatus with an audio interface and a downstream USB port. This apparatus is configured as described in connection with FIG. 2 where the port 212 corresponds to a physical port 703 to establish physical connection for the third channel for communication with a headset 701 via a cable 702 that communicates analogue or digital audio signals. The downstream USB port 208 corresponds to a physical port 705 for the second channel. Corresponding to port 207, a physical port 706 and a physical USB connector 707 establishes the first channel to a USB host at a computer.

Such an apparatus is also denoted a USB headset inline controller. The apparatus comprises master control means such as buttons or control knobs 704 configured to control the processor 204 and/or audio function 203 which in turn is configured to respond to the control means and perform signal processing of the data communicated between the first, second and third channel via the processor.

Figure 8:
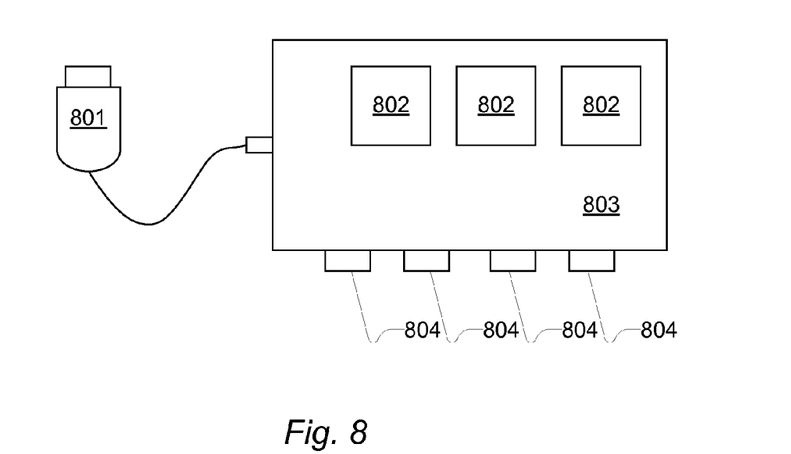
FIG. 8 shows an apparatus with multiple downstream USB ports.

FIG. 8 shows an apparatus with multiple downstream USB ports. This apparatus is configured as described in connection with FIG. 5 where the upstream USB port 506 correspond to a physical connector 801 connecting the apparatus to a computer with USB host and where the Hub ports 508; 509 correspond to the physical ports 804. In this embodiment four USB ports are shown, but fewer e.g. 2 or 3 ports or more ports e.g. 6 or 8 ports can be provided by the USB hub.

In some embodiments the apparatus comprise master controls 802 as described above.

Generally, in some embodiments the USB hub 510 and/or the USB host 514 is/are not a full USB host in the sense that it supports all classes of devices and/or all host services. In some embodiments the USB host controller 514 and/or 214 is restricted to implement a limited set of all USB classes e.g. limited to the audio class and HID class.

Generally, the term USB port refers to a point of access to or from a system or circuit; a point where a USB device is attached e.g. by a USB connector or by a bus interface such as e.g. the PCI bus in a general purpose computer.

The invention claimed is:

1. An apparatus for communication according to the Universal Serial Bus, USB, specification, comprising:
    a USB device that comprises a USB bus interface that connects to an upstream USB port and a USB logical device that provides first USB endpoints for upstream communication on a first channel;
    a USB host that comprises a USB host controller, that connects to a downstream USB port, and a USB driver that provides second USB endpoints for downstream communication on a second channel; wherein the USB host operates concurrently with the USB device; and
    a processor configured to communicate data between the first channel and the second channel via the first USB endpoints and the second USB endpoints, respectively; and
    wherein the processor is configured with a splitter to split a stream of data from the first endpoints of the first channel to respective second endpoints on the second channel and to a third channel; and
    wherein the splitter splits the stream of data to the second channel and the third channel in such a way that respective receivers connected to the second and third channels receive the stream of data originating from the first channel.

2. An apparatus according to claim 1, where the processor is configured
    to communicate data between the first channel and the third channel and/or the second channel.

3. An apparatus according to claim 1, comprising an audio interface with a codec for communicating analogue and/or digital audio data.

4. An apparatus according to claim 3, where the USB device configures as an USB audio class device.

5. An apparatus according to claim 1, comprising a USB hub that provides at least two USB ports for respectively conveying the second channel and third channel.

6. An apparatus according to claim 1, where the USB host configures a downstream USB device during a configuration process; and where the USB device configures firstly as a device of a first class, and secondly, when at least a portion of the configuration process has progressed, re-configures as a device of a second class.

7. An apparatus according to claim 1, where the processor is configured to communicate configuration values and/or state values, via the USB host controller, to a USB device; and where the configuration values and/or state values are determined by the processor.

8. An apparatus according to claim 1, comprising master controls that affect signals communicated on the first channel and/or the second and third channel.

9. A headset system comprising a headset with a loudspeaker and a microphone and an apparatus according to claim 1.

10. An apparatus according to claim 1, where the processor is configured with a mixer to mix audio signals input at the second and third channel and to output a mixed signal on the first channel.

11. A method of communicating according to the Universal Serial Bus, USB, specification, comprising:
    operating a USB device that comprises a USB bus interface that connects to an upstream USB port and a USB logical device that provides first USB endpoints for upstream communication;
    concurrently with operating the USB device, operating a USB host that comprises a USB host controller, that connects to a downstream USB port, and a USB driver that provides second USB endpoints for downstream communication; and
    communicating data between the first channel and the second channel via the first USB endpoints and the second USB endpoints, respectively, by means of a processor;
    splitting a stream of data from the first endpoints of the first channel to respective second endpoints on the second channel and to a third channel; and
    splitting the stream of data such that respective receivers connected to the second and third channels receive the stream of data originating from the first channel.

12. A method according to claim 11, comprising communicating data between the first channel and the third channel and/or the second channel by the processor.

13. A method according to claim 12, comprising:
    splitting a signal from the first channel to both the second channel and the third channel; and/or
    mixing audio signals input at the second channel and the third channel and outputting a mixed signal on the first channel.

14. A method according to claim 12, comprising communicating analogue and/or digital audio data via an audio interface with a codec.

15. A method according to claim 14, comprising configuring the USB device as an USB audio class device.

16. A method according to claim 11, comprising communicating data between the first channel and/or a third channel and the second channel by the processor.

* * * * *